United States Patent
Kulkarni et al.

(10) Patent No.: US 9,411,642 B2
(45) Date of Patent: Aug. 9, 2016

(54) USING HIGH PRIORITY THREAD TO BOOST CPU CLOCK RATE

(71) Applicant: NVIDIA Corporation, Santa Clara, CA (US)

(72) Inventors: Yogish Sadashiv Kulkarni, Pune (IN); Li Li, Cupertino, CA (US); Vikas Ashok Jain, Pune (IN)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/158,721

(22) Filed: Jan. 17, 2014

(65) Prior Publication Data

US 2015/0205636 A1 Jul. 23, 2015

(51) Int. Cl.
*G06F 9/46* (2006.01)
*G06F 9/48* (2006.01)

(52) U.S. Cl.
CPC ............ *G06F 9/4881* (2013.01); *G06F 9/4812* (2013.01); *G06F 9/4893* (2013.01)

(58) Field of Classification Search
None
See application file for complete search history.

(56) References Cited

U.S. PATENT DOCUMENTS

| | | | |
|---|---|---|---|
| 5,163,146 A | 11/1992 | Antanaitis, Jr. et al. | |
| 5,560,017 A | 9/1996 | Barrett et al. | |
| 5,625,826 A | 4/1997 | Atkinson | |
| 5,910,930 A | 6/1999 | Dieffenderfer et al. | |
| 6,175,916 B1 * | 1/2001 | Ginsberg et al. | 712/228 |
| 6,574,739 B1 | 6/2003 | Kung et al. | |
| 6,745,222 B1 * | 6/2004 | Jones | G06F 9/4887 718/103 |
| 7,000,232 B2 * | 2/2006 | Jones | G06F 9/4887 718/103 |
| 7,107,593 B2 * | 9/2006 | Jones | G06F 9/4887 718/103 |
| 7,155,724 B2 * | 12/2006 | Jones | G06F 9/4887 718/103 |
| 7,159,216 B2 * | 1/2007 | McDonald | G06F 9/4881 718/103 |
| 7,353,517 B2 * | 4/2008 | Accapadi | G06F 9/5083 718/102 |
| 7,360,213 B1 * | 4/2008 | Alfieri | 718/100 |
| 7,360,218 B2 * | 4/2008 | Accapadi | G06F 9/4881 718/104 |
| 7,401,208 B2 * | 7/2008 | Kalla | G06F 9/3851 718/103 |
| 7,581,223 B2 * | 8/2009 | Harjula | G06F 9/4843 718/104 |
| 7,600,135 B2 * | 10/2009 | Jones | G06F 1/32 718/102 |

(Continued)

OTHER PUBLICATIONS

Grunwald, et al., "Policies for Dynamic Clock Scheduling"; 2000 USENIX; [retrieved on May 24, 2015]; Retrieved from Internet <URL:http://www.eecs.harvard.edu/~dbrooks/cs246-fall2003/grunwald00policies.pdf>; pp. 1-14.*

(Continued)

*Primary Examiner* — Xi D Chen

(57) ABSTRACT

When a computing system is running at a lower clock rate, in response to an event that triggers the computing system to increase the clock rate, a list of threads pending execution by the computing system is accessed. The list includes a thread that, when executed, causes the clock rate to increase. That thread is selected and executed before any other thread in the list is executed.

16 Claims, 3 Drawing Sheets

---

500

502
WITH THE CPU's CLOCK RATE REDUCED, DETECTING AN EVENT THAT TRIGGERS INCREASING THE CPU's CLOCK RATE

▼

504
ACCESS A LIST OF THREADS PENDING EXECUTION, INCLUDING A THREAD FOR BOOSTING THE CPU's CLOCK RATE

▼

506
IN RESPONSE TO DETECTING THE EVENT, EXECUTE AN INTERRUPT SERVICE ROUTINE

▼

508
IN RESPONSE TO DETECTING THE EVENT, SELECT THE CLOCK RATE BOOSTING THREAD

(56) References Cited

U.S. PATENT DOCUMENTS

| | | | |
|---|---|---|---|
| 7,802,255 B2 * | 9/2010 | Pilkington | G06F 9/3851 718/103 |
| 7,886,131 B1 * | 2/2011 | Kang | 712/220 |
| 8,122,451 B2 * | 2/2012 | McDonald | G06F 9/4881 718/104 |
| 8,230,423 B2 * | 7/2012 | Frigo | G06F 9/30043 718/102 |
| 8,302,098 B2 * | 10/2012 | Johnson | G06F 9/5088 718/104 |
| 8,566,828 B2 * | 10/2013 | Pilkington | G06F 9/4843 718/104 |
| 8,589,938 B2 * | 11/2013 | Craik | G06F 9/4881 718/104 |
| 8,638,805 B2 * | 1/2014 | Sundararaman | H04L 47/621 718/103 |
| 8,694,976 B2 * | 4/2014 | Samra | G06F 9/3851 718/104 |
| 8,869,156 B2 * | 10/2014 | Aulakh | H04L 47/621 718/102 |
| 9,027,027 B2 * | 5/2015 | Vals | G06F 9/4893 718/103 |
| 2002/0124197 A1 | 9/2002 | Atkinson | |
| 2004/0060049 A1 | 3/2004 | Mendoza et al. | |
| 2006/0005097 A1 * | 1/2006 | Ichikawa | G06F 9/5088 718/104 |
| 2006/0070074 A1 * | 3/2006 | Maeda | G06F 1/206 718/104 |
| 2007/0039002 A1 * | 2/2007 | McDonald | G06F 9/4881 718/102 |
| 2007/0153906 A1 * | 7/2007 | Petrescu et al. | 375/240.24 |
| 2007/0220517 A1 * | 9/2007 | Lippett | G06F 1/3203 718/102 |
| 2008/0059813 A1 * | 3/2008 | Khodorkovsky et al. | 713/300 |
| 2009/0217277 A1 * | 8/2009 | Johnson | G06F 1/3203 718/102 |
| 2009/0293061 A1 * | 11/2009 | Schwinn | G06F 9/3851 718/103 |
| 2011/0099550 A1 * | 4/2011 | Shafi | G06F 11/3058 718/102 |
| 2012/0017221 A1 * | 1/2012 | Hankins | G06F 11/3466 718/102 |
| 2012/0023498 A1 * | 1/2012 | Sundararaman | H04L 47/621 718/102 |
| 2012/0331475 A1 * | 12/2012 | Ostrovsky | G06F 9/5016 718/104 |
| 2013/0113527 A1 | 5/2013 | Mienkina | |
| 2013/0151879 A1 * | 6/2013 | Thomson et al. | 713/322 |
| 2013/0152095 A1 * | 6/2013 | McKenney | 718/102 |
| 2015/0074436 A1 | 3/2015 | Jain et al. | |

OTHER PUBLICATIONS

Weiser, et al., "Scheduling for reduced CPU energy"; 1994 USENIX; [retrieved on May 24, 2015]; Retrieved from Internet <URL:http://link.springer.com/chapter/10.1007/978-0-585-29603-6_17>; pp. 449-471.*

Bhattacharjee, et al., "Full-System Chip Multiprocessor Power Evaluations Using FPGA-Based Emulation", 2008 ACM; [retrieved on 11-10-201]; Retrieved from Internet <URL:http://dl.acm.org/citation.cfm?id=1393921.1394010>;pp. 335-340.*

Chong, et al., "Enhanced Parallel Thread Scheduling for Java Based Applications on Multi-Core Architecture", ICACT 2008; [retrieved on 11-10-201]; Retrieved from Internet <URL:http://ieeexplore.ieee.org/stamp/stamp.jsp?tp=&arnumber=4493968>;pp. 1144-1149.*

Lv, et al. "Tackling the Challenges of Server Consolidation on Multi-Core Systems"; 2010 IEEE; retrieved on 11-10-201]; Retrieved from Internet <URL:http://ieeexplore.ieee.org/stamp/stamp.jsp?tp=&arnumber=5654398>;pp. 1-10.*

Yu, et al., "Global Priority Table for Last-Level Caches"; 2011 IEEE; [retrieved on Mar. 30, 2016]; Retrieved from Internet<URL:http://ieeexplore.ieee.org/stamp/stamp.jsp?tp=&arnumber=6119097>;pp. 279-285.*

Nikolopoulos, Polychronopoulus, "Adaptive Scheduling under Memory Pressure on Multiprogrammed Clusters"; 2002 IEEE; [retrieved on Mar. 30, 2016]; Retrieved from Internet<URL:http://ieeexplore.ieee.org/stamp/stamp.jsp?tp=&arnumber=1540437>;pp. 1-8.*

Ottoni, et al., "Automatic Thread Extraction with Decoupled Software Pipelining"; 2005 IEEE; [retrieved on Mar. 30, 2016]; Retrieved from Internet<URL:http://dl.acm.org/citation.cfm?id=1100543>; pp. 1-12.*

Lo, "Performance-Aware Multicore Programming"; 2011 ACM; [retrieved on Mar. 30, 2016]; Retrieved from Internet<URL:http://dl.acm.org/citation.cfm?id=2016077>;pp. 126-131.*

* cited by examiner

USING HIGH PRIORITY THREAD TO BOOST CPU CLOCK RATE

BACKGROUND

Power consumption is of particular concern in limited-power devices (e.g., battery-powered devices) such as laptops and notebooks, smart phones, touchscreen devices, gaming consoles, and the like. These devices are limited in size and weight and generally portable, and therefore they typically use smaller and lighter batteries of limited capacity.

With dynamic frequency scaling, the clock rate for the device's central processing unit (CPU) can be reduced to decrease power consumption during periods of relative inactivity. For example, the device may be used to browse the Internet and scroll through a Web page, in which case the device is active and the CPU is operating at its "normal" clock rate. However, when the user stops scrolling (e.g., while reading the Web page), the device is relatively inactive and its power requirements are consequently less; thus, the device's power consumption can be decreased to save power by decreasing the CPU's clock rate. When the user again starts scrolling or browsing again, the CPU's clock rate needs to be increased (boosted) to accommodate the increased level of activity.

SUMMARY

When a device's CPU is operating at a reduced clock rate, it is desirable to boost the clock rate for the CPU as quickly as possible. The task of boosting the CPU's clock rate is handled by the device's operating system, more specifically the operating system's kernel. However, the kernel typically has other tasks (e.g., threads) waiting to be executed. A scheduler run by the kernel selects the order in which those threads are executed depending on some type of scheme or heuristic that assigns a priority to each of the threads. As a result, execution of the clock rate boosting task might be delayed until one or more other threads are executed.

Embodiments according to the present invention address this problem by generating a "boosting thread" that is dedicated to the task of boosting the CPU's clock rate, including related subtasks such as: changing core voltage, and phase-locked loop (PLL) locking. In addition, the boosting thread is designated the highest priority thread so that it will be executed first—before any other thread—in response to a triggering event. The triggering event may be, for example, an interrupt that is generated in response to a user moving the device's mouse, touching the device's keyboard, or touching the device's touchscreen.

In one embodiment, when a device (specifically, the device's CPU) is running at a lower clock rate, a list of threads scheduled for execution by the device is accessed (e.g., by a scheduler that is run by the device's operating system) in response to an event that triggers the device to increase the clock rate. The list includes a thread that, when executed, causes the clock rate to increase. That thread (the boosting thread referred to above) is selected (e.g., by the scheduler) and executed before any other thread in the list is executed.

In one embodiment, the boosting thread is generated (spawned) when the operating system (more specifically, the kernel) is initialized. In such an embodiment, the boosting thread is assigned the highest priority but is held in a frozen state; in the frozen state, the boosting thread is bypassed by the scheduler. In other words, even though the boosting thread has a higher priority than any other thread, it is not selected for execution and instead the lower priority threads are selected and executed. If, at some point, the CPU clock rate is reduced and then a triggering event occurs (e.g., an interrupt as mentioned above), then the boosting thread transitions to an executable state in which it is ready to be executed. The scheduler can then select the boosting thread; because the boosting thread is the highest priority thread, it will be selected first and executed immediately (that is, before another thread is executed).

In other embodiments, the boosting thread can be generated when the clock rate is reduced, or it can be generated in response to the triggering event (e.g., while the interrupt service routine is servicing the interrupt).

In summary, embodiments according to the present disclosure allow the CPU's clock rate to be increased from a reduced frequency to, for example, its "normal" frequency more quickly relative to conventional techniques. The effect of reducing CPU clock rate on device performance is mitigated because the clock rate can be more quickly returned to its normal level. Generally speaking, embodiments according to the present invention enhance CPU-level power management techniques such as dynamic frequency scaling.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
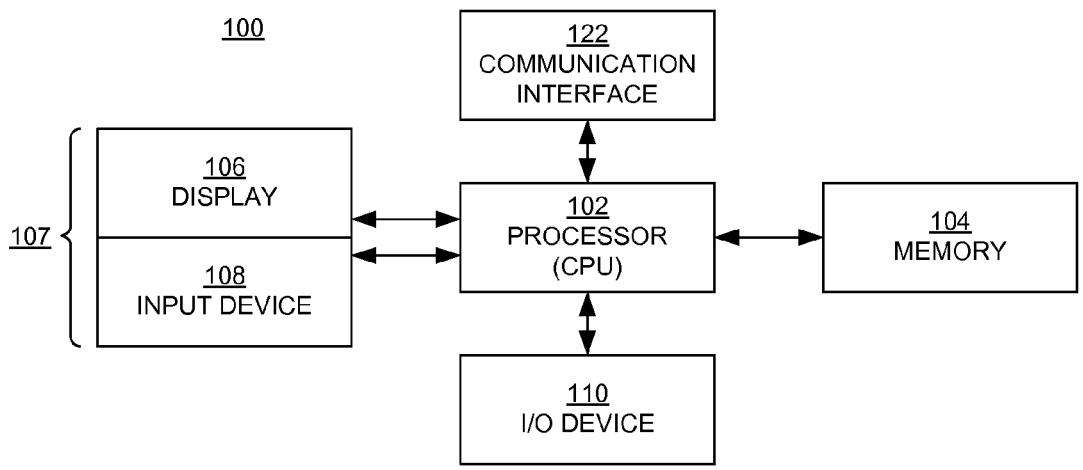
FIG. 1 is a block diagram of an example of a computing system capable of implementing embodiments according to the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "detecting," "accessing," "executing," "causing," "designating," "determining," "selecting," "initializing," "generating," "maintaining," "changing," "scheduling," "reducing," "decreasing," "increasing," "adding," "servicing," or the like, refer to actions and processes (e.g., flowchart 500 of FIG. 5) of a computing system or similar electronic computing device or processor (e.g., the computing system 100 of FIG. 1). The computing system or similar electronic computing device manipulates and transforms data represented as physical (electronic) quantities within the computing system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 100 capable of implementing embodiments according to the present disclosure. The computing system 100 broadly represents any single or multi-processor computing device or system capable of executing computer-readable instructions. Examples of a computing system 100 include, without limitation, a laptop, tablet, or handheld computer. The computing system 100 may also be a type of computing device such as a cell phone, smart phone, media player, camera, gaming console, or the like. The computing system 100 may be powered by a battery and/or by being plugged into an electrical outlet. Depending on the implementation, the computing system 100 may not include all of the elements shown in FIG. 1, and/or it may include elements in addition to those shown in FIG. 1.

In its most basic configuration, the computing system 100 may include at least one processor 102 (CPU) and at least one memory 104. The processor 102 generally represents any type or form of processing unit capable of processing data or interpreting and executing instructions. In certain embodiments, the processor 102 may receive instructions from a software application or module. These instructions may cause the processor 102 to perform the functions of one or more of the example embodiments described and/or illustrated herein.

The processor 102 can operate at different frequencies (clock rates); the frequency (clock rate) can be adjusted on the fly. Operating a processor (CPU) at different frequencies/clock rates is known in the art as dynamic frequency scaling or CPU throttling. The voltage required for stable operation is determined by the frequency, and can be reduced if the frequency/clock rate is also reduced.

The memory 104 generally represents any type or form of volatile or non-volatile storage device or medium capable of storing data and/or other computer-readable instructions. In certain embodiments the computing system 100 may include both a volatile memory unit (such as, for example, the memory 104) and a non-volatile storage device (not shown).

The computing system 100 also includes a display device 106 that is operatively coupled to the processor 102. The display device 106 is generally configured to display a graphical user interface (GUI) that provides an easy to use interface between a user and the computing system.

The computing system 100 also includes an input device 108 that is operatively coupled to the processor 102. The input device 108 may include a touch sensing device (a touch screen) configured to receive input from a user's touch and to send this information to the processor 102. The processor 102 interprets the touches in accordance with its programming.

An input device 108 may be integrated with the display device 106 or they may be separate components. In the illustrated embodiment, the input device 108 is a touch screen that is positioned over or in front of the display device 106. The input device 108 and display device 106 may be collectively referred to herein as a touch screen display 107.

The communication interface 122 of FIG. 1 broadly represents any type or form of communication device or adapter capable of facilitating communication between the example computing system 100 and one or more additional devices.

For example, the communication interface 122 may facilitate communication between the computing system 100 and a private or public network including additional computing systems. Examples of a communication interface 122 include, without limitation, a wired network interface (such as a network interface card), a wireless network interface (such as a wireless network interface card), a modem, and any other suitable interface. In one embodiment, the communication interface 122 provides a direct connection to a remote server via a direct link to a network, such as the Internet. The communication interface 122 may also indirectly provide such a connection through any other suitable connection. The communication interface 122 may also represent a host adapter configured to facilitate communication between the computing system 100 and one or more additional network or storage devices via an external bus or communications channel.

As illustrated in FIG. 1, the computing system 100 may also include at least one input/output (I/O) device 110. The I/O device 110 generally represents any type or form of input device capable of providing/receiving input or output, either computer- or human-generated, to/from the computing system 100. Examples of an I/O device 110 include, without limitation, a keyboard, a pointing or cursor control device (e.g., a mouse), a speech recognition device, or any other input device.

Many other devices or subsystems may be connected to computing system 100. Conversely, all of the components and devices illustrated in FIG. 1 need not be present to practice the embodiments described herein. The devices and subsystems referenced above may also be interconnected in different ways from that shown in FIG. 1. The computing system 100 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into the computing system 100. All or a portion of the computer program stored on the computer-readable medium may then be stored in the memory 104. When executed by the processor 102, a computer program loaded into the computing system 100 may cause the processor 102 to perform and/or be a means for performing the functions of the example embodiments described and/or illustrated herein. Additionally or alternatively, the example embodiments described and/or illustrated herein may be implemented in firmware and/or hardware.

Figure 2:
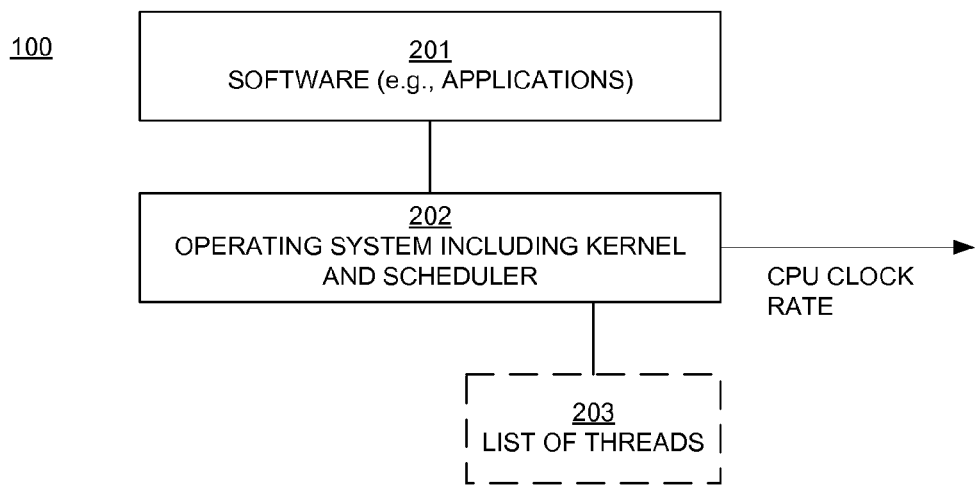
FIG. 2 is a block diagram illustrating examples of components that can be executed by a computing system in embodiments according to the present disclosure.

FIG. 2 is a block diagram illustrating examples of computer-executable components that can be executed by a computing system (e.g., the computing system 100) in embodiments according to the present disclosure. The items include an operating system 201 that includes a kernel and a scheduler. The kernel, for example, manages I/O requests from the software 201 (e.g., software applications) and communicates those requests to the hardware components of the computing system 100 including the processor 102, memory 104, and I/O device 110 (FIG. 1).

The kernel also executes the scheduler, which manages the list 203 of threads. More specifically, in one embodiment, the operating system 201 assigns a priority to each thread in the list 203 of threads, and the scheduler selects threads for execution in their order of priority. In other words, the highest priority thread in the list 203 is executed first, followed by the next highest priority thread, and so on. An incoming thread that has a higher priority than an executing thread can preempt execution of the lower priority thread.

Figures 3, 4:
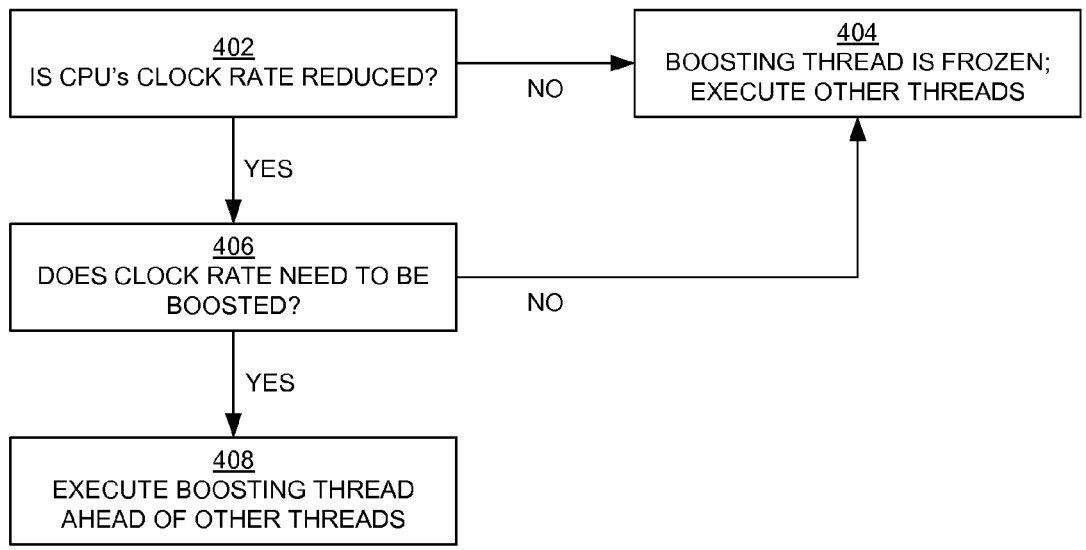
FIG. 3 illustrates a list of threads that can be executed by a computing system in embodiments according to the present disclosure.
FIG. 4 illustrates the use of a CPU clock rate boosting thread in embodiments according to the present disclosure.

FIG. 3 illustrates a list 203 of threads that can be executed by a computing system in embodiments according to the present disclosure. The list 203 can include any number of threads. In the example of FIG. 3, the list 203 includes thread X, thread Y, and a thread referred to herein as a boosting thread.

In one embodiment, the boosting thread is a thread that, when executed, boosts (increases) the clock rate for the CPU. In one such embodiment, the boosting thread is dedicated to the boosting task; that is, it performs only the CPU clock rate boosting task. Note that, within the boosting task, several subtasks may be performed; those subtasks may include, for example: changing core voltage, and phase-locked loop (PLL) locking.

Each of the threads in the list 203 is assigned a priority by the operating system 202 (FIG. 2). In the example of FIG. 3, thread X has priority A, and thread Y as priority B, where priority A is higher than priority B for the sake of this example.

Significantly, the boosting thread is assigned the highest priority; its priority is higher than that of thread X and thread Y as well as any other thread that might be in the list 203. The threads in the list 203 may or may not be arranged according to their priority (e.g., from highest to lowest).

In one embodiment, the boosting thread is generated (spawned) when the operating system 202 (FIG. 2)—specifically, the operating system kernel—is initialized. In such an embodiment, the boosting thread is maintained in a frozen or dormant state until it is needed. Thus, even though it has the highest priority, the boosting thread is not selected by the scheduler for execution (until it is needed). Instead, the other, lower-priority threads (e.g., thread X, followed by thread Y) are selected for execution.

With reference to FIG. 4, in block 402, a determination is made with regard to whether or not the CPU's clock rate is reduced relative to, for example, its maximum value, or relative to some other value. In general, the CPU may operate at any number of different clock rates/frequencies including a first frequency and a second frequency, where the second frequency is less than the first frequency, and where the first frequency is less than or equal to the maximum frequency.

If the CPU is not operating at a reduced rate, then the boosting thread is maintained in the frozen state, and other threads (that inherently have a lower priority than the boosting thread) in the list 203 (FIG. 2) can be executed (block 404).

If, on the other hand, the CPU is operating at a reduced clock rate, then a determination is made with regard to whether or not the clock rate is to be boosted (increased) (block 406 of FIG. 4). For example, some threads may be satisfactorily completed at the reduced clock rate, and thus it is not necessary to increase clock rate to accommodate execution of those threads.

If the CPU is operating at a reduced clock rate and the clock rate is not to be boosted, then the boosting thread is maintained in the frozen state, and other (lower priority) threads in the list 203 (FIG. 2) can be executed (block 404).

On the other hand, the clock rate for the CPU may be boosted in response to some type of a triggering event. The triggering event may be, for example, an interrupt that is generated in response to a user moving the device's mouse, touching the device's keyboard, or touching the device's touchscreen.

If the CPU clock rate is to be boosted, then the boosting thread is transitioned from the frozen state to an executable (non-frozen or active) state. In the executable state, the boosting thread is ready to be executed but is not necessarily executed at this point; it is executed in response to being selected by the scheduler. However, because the boosting thread has a higher priority than any other thread in the list 203 (FIG. 2), it will be selected before those other threads and executed immediately thereafter (block 408 of FIG. 4). The scheduler may not select the boosting thread until after an interrupt service routine (ISR) services the interrupt associated with the event that triggered boosting the clock rate.

As mentioned above, in one embodiment, the boosting thread is generated when the operating system 202 (FIG. 2) is initialized. In another embodiment, the boosting thread is generated in response to the triggering event. For example, the boosting thread may be generated while an ISR is servicing the interrupt associated with the triggering event that provided the impetus for boosting clock rate, assigned the highest priority, added to the list 203 (FIG. 2), and then selected by the scheduler and executed as described above. In yet another embodiment, the boosting thread is generated when the clock rate for the CPU is reduced. In that embodiment, the boosting thread is assigned the highest priority, added to the list 203, held in a frozen state until it is needed and then transitioned to an active state, and then selected by the scheduler and executed as described above.

Figure 5:
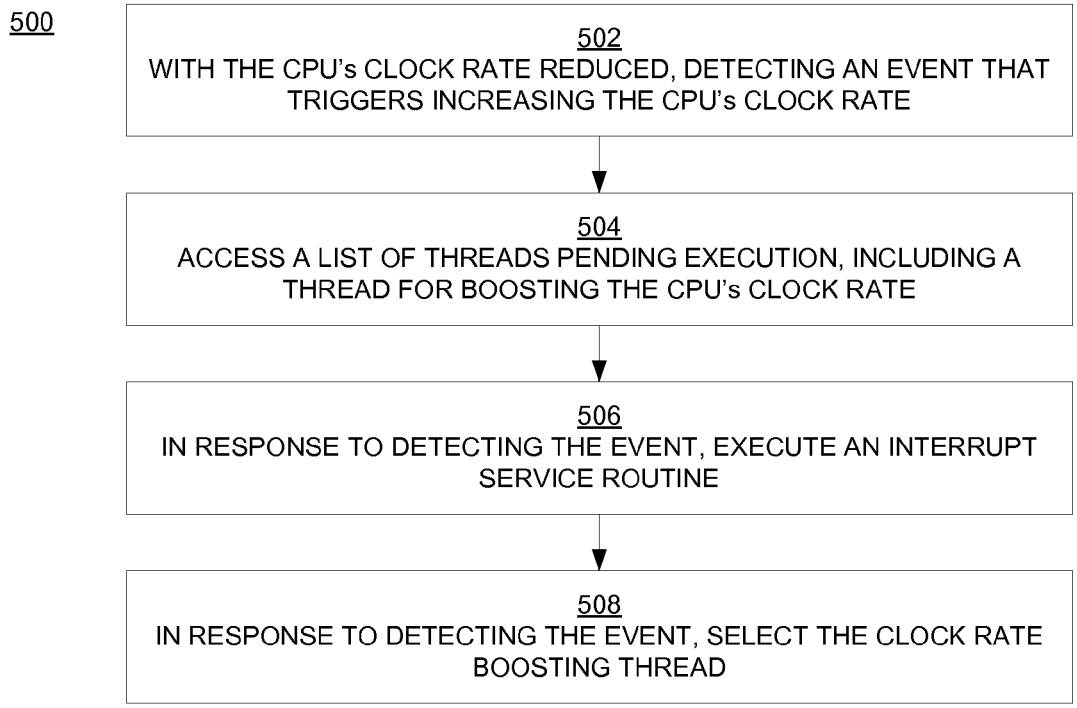
FIG. 5 is a flowchart of an example of a computer-implemented method for boosting CPU clock rate in an embodiment according to the present disclosure.

FIG. 5 is a flowchart 500 of an example of a computer-implemented method for boosting CPU clock rate in an embodiment according to the present disclosure. The flowchart 500 can be implemented as computer-executable instructions residing on some form of computer-readable storage medium (e.g., using the computing system 100 of FIG. 1).

In block 502 of FIG. 5, with the clock rate for a computing system's CPU reduced, an event is detected that triggers initiating an increase in the CPU's clock rate.

In block 504, in response to detecting the triggering event of block 502, a list of threads pending execution (e.g., the list 203 of FIG. 2) is accessed. The list includes a thread (referred to herein as a boosting thread) that, when executed, causes the clock rate for the CPU to increase. The boosting thread is assigned the highest priority. The boosting thread can be added to the list when the computing system's operating system (specifically, the kernel) is initialized, when the CPU's clock rate is reduced, and/or when the triggering event is detected, or at some other time. The boosting thread may be held in a frozen (non-executable) state until it is needed or selected for execution.

In block 506 of FIG. 5, in response to detecting the triggering event of block 502, in one embodiment, an interrupt service routine is executed in order to service an interrupt associated with the triggering event.

In block 508, after the list of threads is accessed in response to the trigger event, the boosting thread is selected (e.g., by a scheduler run by the computing device's operating system) and subsequently executed. If the boosting thread is in a frozen state, it is transitioned to an executable state and then executed.

In summary, embodiments according to the present disclosure provide a CPU clock rate boosting thread (e.g., a thread dedicated to the task of boosting the CPU clock rate) and assign the highest priority to that thread. As a result, the CPU's clock rate can be increased from a reduced frequency to a higher frequency more quickly relative to conventional techniques.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:
1. A computer-implemented method comprising:
 changing a clock rate for a computing system's central processing unit (CPU) from a first frequency to a second frequency, wherein the second frequency is less than the first frequency;
 detecting an event that triggers the computing system's operating system to increase the clock rate from the second frequency;
 generating a first thread and then adding the first thread to a list of threads, wherein the first thread is designated as the highest priority thread in the list of threads, wherein the first thread is a thread dedicated to increasing the clock rate for the CPU;

prior to detecting the event, maintaining the first thread in a frozen state in the list, wherein the first thread in the frozen state is bypassed by the scheduler;

in response to detecting the event, changing the first thread from the frozen state to a different state that allows the first thread to be scheduled for execution; and in response to detecting the event, causing the operating system's scheduler to select the first thread for execution before any other thread in the list of threads.

2. The method of claim 1 further comprising wherein the first thread is generated and added to the list of threads during initialization of the operating system.

3. The method of claim 1 further comprising:

in response to detecting the event, executing an interrupt service routine that services the event; and after the interrupt service routine is finished servicing the event, executing the first thread before executing any other thread in the list of threads.

4. The method of claim 1 further comprising reducing the clock rate from the first frequency prior to the event, wherein the first thread is generated and added to the list of threads in response to said reducing the clock rate.

5. A computing system comprising:

a central processing unit (CPU); and memory coupled to the CPU, the memory have stored therein instructions that, if executed by the computing system, cause the computing system to execute operations comprising:

generating a first thread that, when executed, causes the clock rate for the CPU to increase;

adding the first thread to a list of threads pending execution;

designating the first thread as the highest priority thread in the list of threads;

maintaining the first thread in a frozen state in the list, wherein the first thread in the frozen state is bypassed by the scheduler despite being designated the highest priority thread in the list and despite its presence in the list of threads pending execution;

detecting an event that triggers the computing system's operating system to increase the clock rate for the CPU;

in response to detecting the event, accessing the list of threads pending execution;

in response to detecting the event, changing the first thread from the frozen state to a different state that allows the first thread to be scheduled for execution; and causing the operating system's scheduler to select the first thread for execution before any other thread in the list of threads, the first thread then executed before any of the threads in the list.

6. The computing system of claim 5 wherein, although the first thread is designated as the highest priority thread in the list of threads, the operations further comprise, prior to detecting the event, selecting other threads in the list for execution ahead of the first thread.

7. The computing system of claim 5 wherein the first thread is generated during initialization of the operating system.

8. The computing system of claim 5 wherein the operations further comprise:

in response to detecting the event, executing an interrupt service routine that services the event; and after the interrupt service routine is finished servicing the event, executing the first thread before executing any other thread in the list of threads.

9. The computing system of claim 5 wherein the operations further comprise reducing the clock rate prior to the event, wherein the first thread is generated in response to reducing the clock rate.

10. The computing system of claim 5 wherein the first thread is a thread dedicated to increasing the clock rate for the CPU.

11. A non-transitory computer-readable storage medium having computer-executable instructions that, when executed, cause a computing system to perform a method comprising:

detecting an event that triggers the computing system to increase a clock rate for the computing system's central processing unit (CPU);

accessing a list of threads pending execution by the computing system, the list comprising a first thread that, when executed, causes the clock rate for the CPU to increase;

prior to detecting the event, maintaining the first thread in a frozen state in the list, wherein the first thread in the frozen state is bypassed by the operating system's scheduler;

in response to detecting the event, changing the first thread from the frozen state to a different state that allows the first thread to be scheduled for execution; and in response to detecting the event, causing the first thread to be selected for execution before any other thread in the list of threads.

12. The computer-readable medium of claim 1 wherein the first thread is designated as the highest priority thread in the list of threads, wherein the method further comprises, prior to detecting the event, selecting other threads in the list for execution ahead of the first thread.

13. The computer-readable medium of claim 1 wherein the method further comprises, during initialization of the computing system's operating system, generating the first thread and then adding the first thread to the list of threads, wherein the first thread is designated as the highest priority thread in the list of threads.

14. The computer-readable medium of claim 1 wherein the method further comprises:

in response to detecting the event, executing an interrupt service routine that services the event; and after the interrupt service routine is finished servicing the event, executing the first thread before executing any other thread in the list of threads.

15. The computer-readable medium of claim 1 wherein the method further comprises:

reducing the clock rate prior to the event; and in response to reducing the clock rate, generating the first thread and then adding the first thread to the list of threads in the frozen state, wherein the first thread is designated as the highest priority thread in the list of threads.

16. The computer-readable medium of claim 1 wherein the first thread is a thread dedicated to increasing the clock rate for the CPU.

* * * * *